(12) United States Patent
De Wergifosse

(10) Patent No.: US 10,870,481 B2
(45) Date of Patent: Dec. 22, 2020

(54) PITCH ACTUATION SYSTEM FOR A TURBOMACHINE PROPELLER

(71) Applicant: SAFRAN AIRCRAFT ENGINES, Paris (FR)

(72) Inventor: Huguette De Wergifosse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 13 days.

(21) Appl. No.: 16/094,449

(22) PCT Filed: Apr. 10, 2017

(86) PCT No.: PCT/FR2017/050863
§ 371 (c)(1),
(2) Date: Oct. 17, 2018

(87) PCT Pub. No.: WO2017/182734
PCT Pub. Date: Oct. 26, 2017

(65) Prior Publication Data
US 2019/0118936 A1    Apr. 25, 2019

(30) Foreign Application Priority Data
Apr. 20, 2016  (FR) ..................................... 16 53471

(51) Int. Cl.
*B64C 11/44*    (2006.01)
*F01D 7/00*     (2006.01)
(Continued)

(52) U.S. Cl.
CPC ................ *B64C 11/44* (2013.01); *F01D 7/00* (2013.01); *F01D 7/02* (2013.01); *F02C 6/20* (2013.01);
(Continued)

(58) Field of Classification Search
CPC . B64C 11/44; F02C 6/206; F01D 7/00; F01D 7/02; F05D 2260/75;
(Continued)

(56) References Cited

U.S. PATENT DOCUMENTS 2,370,135 A * 2/1945 Berliner .................. B64C 11/44
                                                    416/152
2,548,045 A * 4/1951 Nichols .................... B63H 3/04
                                                    416/155
(Continued)

OTHER PUBLICATIONS

Written Opinion of the International Searching Authority dated Jul. 21, 2017, issued in corresponding International Application No. PCT/FR2017/050863, filed Apr. 10, 2017, 4 pages.
(Continued)

*Primary Examiner* — Christopher Verdier
(74) *Attorney, Agent, or Firm* — Christensen O'Connor Johnson Kindness PLLC

(57) ABSTRACT

A pitch actuation system for a turbomachine propeller, comprising an actuator with a movable portion configured to be connected to blades of the propeller in order to rotate them relative to the blade-pitch setting axes, wherein the actuator is an electromechanical actuator and comprises: blade-pitch control having a transmission screw rotated about an axis; a nut through which the transmission screw passes; and a member configured to engage with the blades in order to move the blades, wherein the nut is connected to the member via a decoupler configured such that a translational movement of the nut causes a translational movement of the member, but rotational movement of the member does not cause rotational movement of the nut.

9 Claims, 2 Drawing Sheets

(51) Int. Cl.
*F02C 6/20* (2006.01)
*F01D 7/02* (2006.01)

(52) U.S. Cl.
CPC ........ *F02C 6/206* (2013.01); *F05D 2220/324* (2013.01); *F05D 2220/36* (2013.01); *F05D 2260/40311* (2013.01); *F05D 2260/74* (2013.01); *F05D 2260/75* (2013.01); *F05D 2260/79* (2013.01); *F05D 2270/09* (2013.01); *F05D 2270/62* (2013.01)

(58) Field of Classification Search
CPC ............. F05D 2260/79; F05D 2260/74; F05D 2270/62; F05D 2220/324; F05D 2260/40311; F05D 2270/09
See application file for complete search history.

(56) References Cited

U.S. PATENT DOCUMENTS

| | | |
|---|---|---|
| 3,900,274 A | 8/1975 | Johnston et al. |
| 4,591,313 A | 5/1986 | Miyatake et al. |
| 5,028,207 A | 7/1991 | Rohra et al. |
| 2004/0042897 A1 | 3/2004 | Pietricola |
| 2010/0310368 A1 | 12/2010 | Perkinson et al. |
| 2011/0014046 A1 | 1/2011 | Gallet |
| 2011/0274545 A1 | 11/2011 | Morgan |

OTHER PUBLICATIONS

International Preliminary Report on Patentability dated Oct. 23, 2018, issued in corresponding International Application No. PCT/FR2017/050863, filed Apr. 10, 2017, 1 page.
International Search Report dated Jul. 21, 2017, issued in corresponding International Application No. PCT/FR2017/050863, filed Apr. 10, 2017, 3 pages.
Written Opinion of the International Searching Authority dated Jul. 21, 2017, issued in corresponding International Application No. PCT/FR2017/050863, filed Apr. 10, 2017, 5 pages.

\* cited by examiner

PITCH ACTUATION SYSTEM FOR A TURBOMACHINE PROPELLER

TECHNICAL FIELD

Embodiments of the disclosure relate to a pitch actuation system for a turbomachine propeller, such as a turbo prop.

BACKGROUND

The state of the art comprises especially document U.S. Pat. No. 4,591,313.

A turbo prop comprises at least one propeller comprising a hub and blades carried by the hub and extending substantially radially outwards with respect to the hub and to the axis of rotation of the propeller.

The turbo prop is in general equipped with an actuation system of the propeller pitch, also called an angular setting system of the blades of the propeller. The regulating of the setting of the propeller blades makes it possible to improve their effectiveness by guaranteeing a rotation speed of the propeller for each flight phase.

Each blade can be displaced in rotation about an axis, in general radial, between a first backup position referred to as the feathered position wherein it extends substantially parallel to the axis of rotation of the propeller, and a second position wherein it is strongly inclined with respect to this axis. It can adopt any position between these two extreme positions.

In the current technique, the actuation system used is a hydraulic system, which is relatively complex and has several disadvantages. This system comprises an actuator whose movable portion is connected to the blades of the propeller for the purpose of setting them.

The actuation system must not only be able to provide the function of pitch control but also the backup feathered position of the blades. The pitch actuation system therefore comprises an auxiliary system for the backup function.

The breakdown linked to the hydraulic leak, a common mode between the pitch control system and the auxiliary system, must be covered. In the absence of a source of pressure, it is indispensable to add counterweights on the blades in order to ensure the feathering function.

The pitch actuation system must also provide protective functions in the case of overspeed, in case of a stopped motor, in case of a failure with the FADEC computer (Full Authority Digital Engine Control), and ensure the limitation of small pitches in flight. A set of mechanical systems and hydraulic systems are therefore part of the pitch actuation system in order to ensure these functions in the current technique.

The pitch control system is also subjected to very constraining breakdown rate requirements, which implies redundancies and additional protective systems.

In conclusion, the technology and the operating principle of a hydraulic system for actuating the propeller pitch are currently complex. A multitude of hydraulic components are integrated into these systems.

The present disclosure makes it possible to overcome these disadvantages and provides a solution to all or part of the problems of the current technique disclosed below.

The first problem (problem A) concerns the stringent FHA requirements (Functional Hazard Assessment) for the pitch control, which involves robust architectures with redundancy.

The second problem (problem B) concerns the feathering function, which must be able to be ensured even after a failure of the means for controlling the pitch.

The third problem (problem C) concerns the risk of blocking of the movable portion of the actuator. In a hydraulic system, the rotation of a blade of the propeller is obtained by the translation of an eccentric at the root of the blade. The axial blocking of the hydraulic cylinder is considered to be a failure.

Moreover, in a hydraulic system, the rotation of the propeller is transmitted to the hydraulic actuator positioned in the rotating point of reference (piston and body without angular displacement). This cylinder is supplied by lines via a hydraulic slide positioned in the fixed point of reference. In this hydraulic concept, the rotation of the propeller does not cause any offset in the pitch of the propeller. The fourth problem (problem D) concerns the management of this phenomenon.

Finally, the fifth problem (problem E) concerns the protective functions other than that covering the failure of the pitch control, which require additional mechanical and hydraulic devices in a hydraulic system of the current technique.

SUMMARY

The disclosure proposes a pitch actuation system for a turbomachine propeller, comprising an actuator with a movable portion configured to be connected to blades of the propeller in order to rotate them relative to the blade-pitch setting axes, characterised in that the actuator is an electromechanical actuator, and comprises:

blade-pitch control means, that comprise at least one electric motor driving a rotor about an axis, and a transmission screw driven in rotation about the axis by the rotor, a nut through which the transmission screw passes and cooperating with this screw so as to move in translation along the axis, a member movable both in translation along the axis and in rotation about this axis, and configured to cooperate with the blades in order to move the latter, and in that the nut is connected to the movable member via decoupling means configured such that a translational movement of the nut causes a translational movement of the member but a rotational movement of the member does not cause the rotational movement of the nut.

The hydraulic actuator of prior art is thus replaced with an electromechanical actuator whose movable portion comprises a transmission screw. The displacement in rotation of the blades is obtained by a translation of the nut on the transmission screw which is driven in rotation by the rotor common to the electric motors.

The present disclosure thus proposes a solution to the problem D of coupling of the rotation of the propeller with the transmission system. It is important that a decoupling system of the rotation of the propeller of the transmission system is integrated into the electromechanical design in order to suppress the continuous driving of the transmission screw. Without this decoupling, during the maintaining of the pitch of the propeller, the displacement of the nut generated by the rotation of the propeller must constantly be compensated by controlling the pitch. The rotation of the transmission screw generated by the electric motor must follow the rotation of the propeller during each flight phase. Without this decoupling, the control of the pitch of the propeller being obtained by the variations in the rotation of the shaft of the propeller and by the rotation of the transmission screw, the power to be delivered would be substantial. This power is indeed the result of the effect of the product of the rotation speed of the propeller and of the torque used to overcome all of the external forces. Without this decoupling, the size of the rotating machines and of the mechanical case would be penalised as they would depend on the electrical power to be delivered.

The system proposed is preferably able to ensure the reliability required by an electrical redundancy on electrical components as well as on the control and independent power circuits controlled by a computer. This system is then able to ensure its function of pitch control even in case of a short-circuit in the electrical power supply.

This electromechanical concept may not require any mechanical energy coming from the turbomachine. The case of the breakdown with motor power loss and with a stopped motor can therefore be covered with a protective case by the nominal electromechanical system without any additional device. This electromechanical concept also makes it possible to cover the case of overspeed and the failure of the FADEC without any complementary device.

In a hydraulic system, the rotation of a blade of the propeller is obtained by the translation of an eccentric at the root of the blade. The failure resulting from the axial blocking of the hydraulic cylinder (problem C), that generates this translation, is considered to be extremely unlikely. This low value in the breakdown rate seems to be confirmed by feedback. With the system according to the disclosure, the basic system may not comprise any redundancy of the transmission screw. We also consider the hypothesis that the failure rate of the latter is low, which could be demonstrated by the low failure rates based on applications that incorporate transmission screws.

Concerning the problem E, the concept proposed does not require any additional device, unlike the hydraulic system, in order to cover the protection functions other than that covering the failure of the pitch control. In a hydraulic system, the case of a motor stopped or the loss of motor power leads to a suppression of the hydraulic energy of the pump coupled to the motor, an auxiliary system is to be provided. In an electromechanical system, for these cases of breakdown, the electrical energy is delivered by an independent source. The feathering function therefore remains active in order to cover these cases of breakdown, more preferably via a protective case. In a hydraulic system, the case of overspeed is covered by a mechanical system of counterweights. In the electromechanical system, preferably thanks to a speed return, the motor control laws can act on the electric pitch control motors via the protective case in order to ensure feathering.

Advantageously, the first means comprise two electric motors, preferably synchronous, for driving the same first rotor. The choice of the technology and the strategy for sizing these electrical means make it possible to minimise the short-circuiting torque and to achieve reasonable sizes for motors. The electrical redundancy at the level of electric motors makes it possible to respect the FHA reliability requirements (problem A). In order to retain a simple architecture, it is here proposed to mutualise the rotors of the electric motors. This makes it possible to retain only one transmission chain and to have a relatively compact system. The concept proposed offers this advantage.

The system proposed is preferably able to ensure the required reliability by an electrical redundancy concerning the electrical components as well as the control and independent power circuits controlled by a computer. This system is then able to ensure its pitch control function even in the case of a short-circuit of the electrical power supply.

This electromechanical concept may require no mechanical energy coming from the turbomachine. The case of the breakdown with motor power loss and with a stopped motor can therefore be covered via a protective case by the nominal electromechanical system without any complementary device. This electromechanical concept also makes it possible to cover the case of overspeed and the failure of the FADEC without any complementary device.

The system according to the disclosure can comprise one or several of the following characteristics, taken individually or in combination with each other:

the decoupling means comprise at least one ring and two angular contact roller bearings, a first angular contact bearing being mounted between the ring and the nut and a second angular contact bearing being mounted between the ring and the member; the redundancy of the angular contact bearing makes it possible to cover the case of seizing of the bearing. Indeed, in the absence of redundancy, the seizing of this bearing would cause the breakage of the system, and for example of the anti-rotation means of the transmission screw, the second angular contact bearing comprises an inner ring mounted on a sleeve comprising a blind orifice for receiving an end of the member, an electric motor is mounted between the ring and the nut and comprises a rotor secured to the ring and a stator secured to the nut, a sensor is mounted between the ring and the nut and comprises a first element secured to the ring and a second element secured to the nut, the sensor is of the inductive or Hall effect type; the two bearings cannot be sources of dormant breakdowns in the system; it is therefore imperative to be able to detect the condition of the two angular contact bearings before the flight; in case of failure of one of the two bearings before flight, the seizing of the other bearing in flight will cause under the rotation of the propeller the breakage of the anti-rotation means as mentioned hereinabove; the decoupling system as such comprises a device that makes it possible when stopped to control the condition of the two angular contact bearings;

the system comprises means for blocking the nut in rotation, the means for blocking in rotation are carried by a casing of the actuator and cooperate with the nut.

the rotor of the control means is connected to the transmission screw by a reduction gear, for example planetary reduction gear, a planet carrier of the reduction gear is rotationally-guided by a pair of angular contact and inverted bearings, the control means include at least two resolvers, the system comprises means for feathering the blades, which comprise for example at least one asynchronous motor; the choice of this type of electric motor for the feathering makes it possible to reduce the control case and to suppress any resistive torque linked to short-circuiting (problem B), the control means comprise two electric motors, such as synchronous motors, the two electric motors are connected respectively to two electronic control cases, each of which is configured to be active when the other is passive, and inversely.

This disclosure also relates to a turbomachine, such as a turbo prop, comprising a propeller whose blades are of a variable pitch and a system such as described above, wherein the first nut cooperates with eccentrics provided on plates for supporting and rotating blades.

This disclosure finally relates to a method for verifying the condition of the angular contact bearings of a system such as described hereinabove, comprising the steps consisting, when the means of controlling the pitch are inactive, of:

actuating the motor mounted between the nut and the ring in such a way as to set the ring in rotation about the nut, and controlling the rotation of the ring by means of the sensor.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter.

Figures 1, 2:
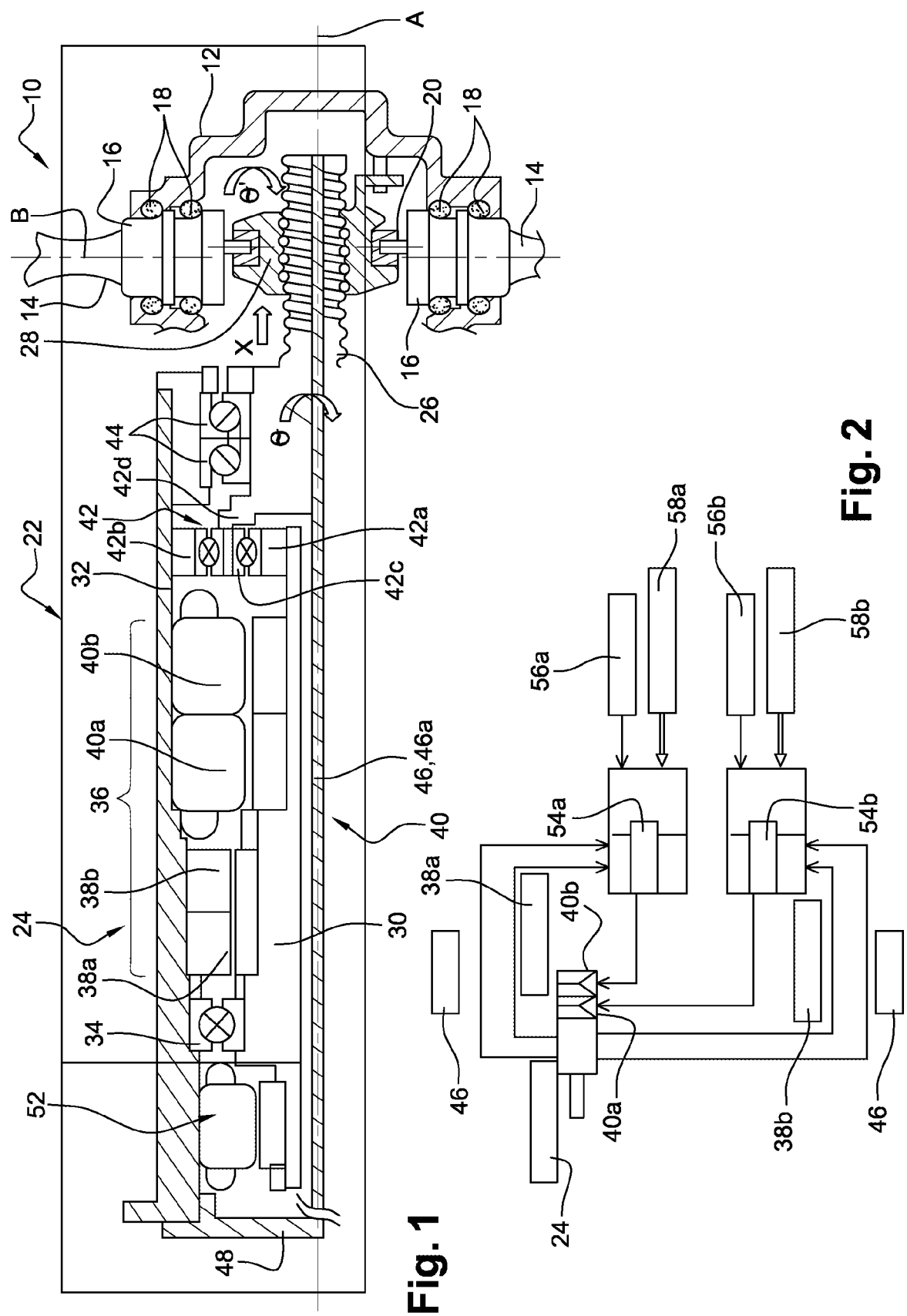
FIG. 1 is a partial diagrammatical half-view as an axial cross-section of a pitch actuation system of the blades associated with a turbomachine propeller.
FIG. 2 is a block diagram showing the general architecture of the actuation system and the electrical control means of the system of FIG. 1.

Reference is first made to FIG. 1.

A turbomachine propeller 10, and in particular of a turbo prop is in general not streamlined and comprises a movable hub 12 (arrow θ of FIG. 1) with an axis A of rotation, the hub carrying blades 14 that extend substantially radially with respect to the axis A. Each blade 14 is connected at its radially internal end to a substantially cylindrical plate 16 for supporting and guiding in rotation of the blade for the purpose of setting it in rotation about an axis B, here substantially radial. The plate 16 of each blade 14 is mounted in a housing of the hub 12 and is centred and guided in this housing by bearings 18 extending about the axis B. The radially internal end of each blade comprises an eccentric 20. The latter is integrally connected to the plate 16 and an actuation system 22 can displace it in rotation about the axis B. The displacement of the eccentrics 20 causes a displacement in rotation of the plates 16 and therefore of the blades 14 about the axes B. Each blade 14 can be set to a pitch or in a given position about its axis B, between two extreme positions, of which one, called feathered, corresponds to the case where the chord of the transversal section of the blade extends substantially parallel to the axis A.

In the prior art, the actuation system was hydraulic, and had many disadvantages. FIG. 1 shows an electromechanical actuation system.

The actuation system 22 of FIG. 1 comprises an electromechanical actuator 24, whose movable portion comprises a transmission screw 26 associated with a nut 28 and is guided in translation with respect to the hub 12 and configured to cooperate with the eccentrics 20 of the blades 14 in order to move the latter in rotation with respect to the axis B.

The nut 28 comprises housings intended to receive the eccentrics 20 and to drive them during displacements of the nut 28. Each housing receives, for example, an eccentric finger 20 of the corresponding blade 14, each finger being arranged protruding in the housing. The nut is thus secured in motion with the blades, and therefore with the propeller when the latter is in rotation with respect to the axis A. The nut 28 is thus arranged to be movable in rotation with respect to the axis A in a fixed point of reference.

The transmission screw 26 extends along the axis A and is movable in rotation with respect to the axis A. It passes through the nut 28 and thus comprises a thread that is complementary with that of the nut. The nut 28 is thus also arranged to be movable in translation with respect to the axis A in the same fixed point of reference. The transmission screw 26 advantageously has a reversibility function in that it is able to be subjected by the actuator to a rotation torque so as to cooperate with the nut and displace it, and also to be subjected by the nut to axial forces causing a rotation of the transmission screw. In this aspect, it distinguishes itself from an endless screw, which has an irreversibility function.

It is understood that the rotation of the transmission screw 26 (arrow θ of FIG. 1) drives a displacement in translation of the nut 28 along the axis A. The rotation of the transmission screw 26 thus drives a translation of the nut 28, which in turn drives a displacement of the eccentrics 20 and a rotation of the blades 14 with respect to the axis B. The arrow X represents the axial displacement of the nut along the axis A and the arrow θ' represents the rotation of a blade 14 about an axis B.

The transmission screw 26 is driven by a rotor 30 of the actuator 24 which is centred and guided by bearings in a casing 32, of a stator in the example shown. The casing 32 is thus fixed. It has a general cylindrical elongated shape along axis A.

The rotor 30 has an elongated shape along axis A and is here guided in the casing 32 by at least one bearing 34. The bearing 34, here a roller bearing and more specifically a ball bearing, is mounted at the axial end of the actuator, opposite the propeller (end on the left in the drawing).

The actuator 24 comprises first electrical control means 36 for the pitch of the blades. In the example shown, these electrical means 36 comprises two resolvers 38a, 38b and two electric motors 40a, 40b, which are here synchronous machines. The resolvers 38a, 38b are arranged next to one another and have as a common axis, the axis A. The electric motors 40a, 40b are arranged next to one another and also have as common axis, the axis A. The resolvers 38a, 38b are here arranged between the bearing 34 and the electric motors 40a, 40b.

Each resolver 38a, 38b comprises a resolver rotor mounted on the common rotor 30, and a resolver stator secured to the casing 32. The resolver rotors and stators in general comprise windings. In a known manner, a resolver makes it possible to obtain an electrical value from a change in the angle of a rotor. A resolver operates like a transformer of which the coupling varies with the mechanical angle of the rotor. When the rotor winding is excited with an alternating voltage, an alternating voltage is recovered on the winding of the stator. The redundancy linked to the use of two resolvers 38a, 38b instead of one, makes it possible to guarantee the reliability requirements mentioned above.

Each electric motor 40a, 40b is here of the synchronous machine type and comprises a rotor mounted on the common rotor 30, and a stator secured to the casing 32. The rotor may be composed of permanent magnets or consist of a winding supplied with continuous current and a magnetic circuit (electromagnet). To produce a current, an external force is used to rotate the rotor: its magnetic field, by rotating, induces an alternating electric current in the windings of the stator. The speed of this rotating field is called "synchronous speed". The synchronous speed is directly linked to the frequency of the electrical power supply. The motors are here supplied with a three-phase current system.

As can be seen in the drawing, the transmission screw 26 is driven by the common rotor 30 using a reduction gear 42, which is here a planetary reduction gear or epicyclic reduction gear. This reduction gear 42 comprises planetary shaft 42a rotationally secured to the common rotor 30, an outer ring gear 42b surrounding the planetary shaft and secured to the casing 32, planet gears 42c meshing with the planetary shaft 42a and the outer ring gear 42b and carried by a planet carrier 42d which is here rotationally secured to the transmission screw 26. In the example shown, the transmission screw 26 and the planet carrier 42d are formed of a single part.

The part comprising the planet carrier 42d and the transmission screw 26 is centred and guided in the casing 32 by a pair of roller bearings, here ball bearings. These bearings 44 have an angular contact. They are inverted and mounted next to one another at the axial end of the actuator located on the side of the propeller 10 (end on the right in the drawing).

The actuation system 22 further comprises at least one sensor 46 of the LVDT (Linear Variable Differential Transformer) type. In the example shown, the transmission screw 26 comprises an inner axial bore to which is secured in a sliding configuration a ferromagnetic LVDT plunger 46a carried by a rear cover 48 of the actuator 22, which is itself fixed to the stator casing 32. Although it is not shown, the plunger 46a is surrounded by several windings carried by the transmission screw 26, of which at least one primary winding powered by an alternating current and two secondary windings. These windings are preferably made redundant to increase the reliability of the system. The axial displacement of the plunger 46a inside the windings, channels the flux and generates voltages in the secondary windings whose amplitudes depend on the position thereof. The sensor 46 thus provides a voltage proportional to the displacement of the plunger 46a.

The turbo prop is equipped with an auxiliary system for feathering the blades 14, which is here electromechanical. The system is incorporated into the actuator 22 and comprises an electric motor 52, which is preferably an asynchronous machine (to not generate a resistive torque), of which the stator is secured to the casing 32 and whose rotor is secured to the common rotor 30. In the example shown, it is mounted between the rear cover 48 and the bearing 34.

The use of an electromechanical system for the feathering offers the following advantages: the control case is simple and of high reliability; the case of short-circuiting is not to be covered, it is not necessary to oversize synchronous machines in order to cover this case of breakdown; in the absence of short-circuiting induced by this motor, the rotor can be mounted directly on the axis of the rotor of synchronous machines and benefit from the reduction ratio of the gearings. Additional reduction gears are not necessary.

Reference is now made to FIG. 2, which diagrammatically represents the electrical diagram of the operation of the system of FIG. 1.

The elements described above are designated by the same reference number in FIG. 2.

FIG. 2 shows especially the control means of the electrical machines of the system, namely, in the case where the redundancy applies to all of these machines, two LVDT sensors 46, two resolvers 38a, 38b, and two electric motors 40a, 40b.

The control means include especially two segregated electronic control cases 54a, 54b which are each connected to a resolver, a sensor and an electric motor, and which have the capacity of controlling these machines independently.

The cases 54a, 54b operate in "passive-active" mode. In nominal mode, the pitch is controlled by the electronic case 54a for example, and the electronic case 54b is in passive mode. In case of a breakdown detected by a position error for example, the case 54a is deactivated and the case 54b is activated. The cases 54a, 54b comprise three local nested slaving loops: a torque loop that uses phase current measurements, a speed loop that uses the resolver, and a linear position loop that uses the LVDT sensor. The cases 54a, 54b receive the position instruction respectively from computer cases 56a, 56b and are associated with electrical networks 58a, 58b, to send a current command to the motors 40a, 40b.

Although it is not shown in FIG. 2, the control means further comprise an independent electrical power supply device of the electric motor 52.

This concept of the electromechanical type for the pitch actuation system is very innovating because it offers the following advantages:
  simple and robust architecture with a minimum of electromechanical components in compliance with the constraining reliability criteria,
  suppression of the case of the breakdown linked to a hydraulic leak, a case that would require the adding of counterweights for feathering,
  suppression of the counterweights of the prior art, for the feathering of the blades,
  suppression of all of the complementary devices to cover the case of breakdowns other than the one linked to the failure of the pitch control.

In the system described above, the casing 32 is fixed and the assembly formed by the transmission screw 26 and the nut 28 is with three degrees of freedom: in a fixed point of reference, the nut 28 has two degrees of freedom (in translation and in rotation with respect to the axis A—respectively arrows X and θ'), and the transmission screw 26 has a single degree of freedom (in rotation about the axis A-arrow θ). To prevent the nut 28 from being displaced in translation on the transmission screw 26 (which would generate a modification in the pitch of the blades), the latter has to rotate at the same angular speed as the propeller (θ'=θ). To maintain the pitch of the blades, it is necessary to synchronise the speed of the motors 40a, 40b with the speed of the propeller 10. On the contrary, to vary the pitch of the blades, it is necessary to desynchronise the speed of the electric motors from the speed of the propeller.

Figure 3:
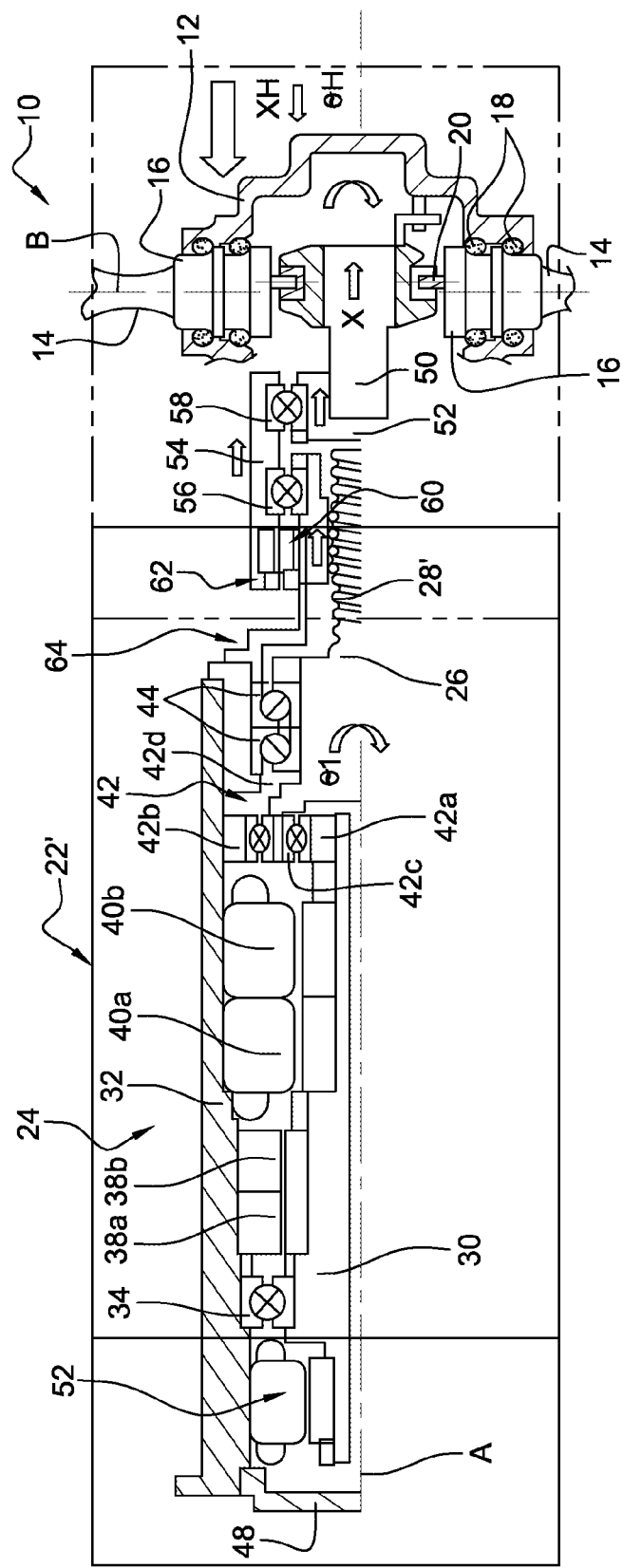
FIG. 3 is a partial diagrammatical half-view as an axial cross-section of a pitch actuation system of the blades according to the disclosure associated with a turbomachine propeller.

Reference is now made to FIG. 3, which represents an embodiment of the disclosure, wherein the pitch actuation system 22' is similar to the one of FIG. 1 and further comprises decoupling means that make it possible to provide a solution to the problem D mentioned hereinabove.

The system 22' of FIG. 3 comprises all of the characteristics of the system 22 of FIG. 1 with the exception of those which are in contradiction with what follows.

In the system 22', the nut 28' through which the transmission screw 26 passes is connected via decoupling means to a member 50 which is connected to the eccentrics of the blades 14.

The member 50 is movable in translation and in rotation with regard to the axis A. It comprises orifices for receiving eccentrics of blades 14 and is thus rotationally secured to the blades 14. It is thus intended to rotate with the propeller 10 about the axis A. Its displacements in translation along the axis A make it possible to displace the eccentrics and therefore the blades 14 about their axes B.

The member 50 comprises a cylindrical end secured to a blind hole of a sleeve 52. The nut 28' and the sleeve 52 are surrounded by a movable ring 54. A first roller bearing 56 (here a ball bearing) with angular contact is mounted between the nut 28' and the ring 54 and a second roller bearing 58 (ball bearing) with angular contact is mounted between the sleeve 52 and the ring 54. Conventionally, the inner ring of each bearing 56, 58 is rotationally secured to the nut 28' or to the sleeve 52, and its outer ring is rotationally secured to the ring 54.

Moreover, an electric motor 60 is mounted between the nut 28' and the ring 54 and comprises a stator secured to the nut and a rotor secured to the ring. This motor 60 is associated with a sensor 62 that is also mounted between the nut 28' and the ring 54 and comprises a stator element secured to the nut and a rotor element secured to the ring. The sensor is of the Hall effect or inductive type in order to control the rotation of the outer ring.

The system further comprises means 64 of anti-rotation of the nut 28' on the transmission screw 26. These means 64 here comprise an axial finger carried by the casing 32 and engaged in a housing with a form complementary to the nut 28'.

In this electromechanical concept, the casing 32 of the motors 40a, 40b does not undergo any movement in axial translation. The rotor 30 of these motors is connected to the transmission screw 26 by the intermediary of the reduction gear 42. The screw 26 is driven in rotation and blocked in translation by the angular contact bearings 44. The rotation of the screw 26 causes the axial translation of the nut 28'.

The angular contact bearings 56, 58 make it possible to transmit the translation of the nut 28' to the member 50 and then to the eccentrics subjected to the rotation of the propeller 10. However, the rotation of the propeller is decoupled from the movement of the nut 28' thanks to the angular contact bearing 58. The movement of the nut 28' can thus be limited to translation.

The displacement of the eccentrics depends on the balance between the external force and the force developed by the torque of the motors 40A, 40b. The decoupling means comprise a device that makes it possible when stopped to control the condition of the two bearings 56, 58. This device is composed of elements of the motor 60 and of the sensor 62. With the motor stopped, the motor 60 drives in rotation the outer ring of the two bearings 56, 58 by delivering a torque that is sufficient to overcome the friction of these two bearings. The rotation of the outer ring is then controlled by the sensor 62. In case of seizing or ageing of only one of the two bearings, the degradation can be observed both via the value of the current of the motor and by the rotation of the outer ring. This device thus suppresses any risk of a dormant breakdown before flight. In case of blockage of one of the angular contact bearings, the other ensures the decoupling and prevents breakage of the anti-rotation means.

The control means described above in reference to FIG. 2 can be used and adapted in order to control the system of FIG. 3, including the motor 60 and the sensor 62.

This electromechanical concept thanks to the decoupling of the rotation of the propeller and its control device makes it possible to reduce: the power taken, the size of all of the electrical components, including the electronic case, and the size of all of the mechanical components via a relief of the stresses.

The principles, representative embodiments, and modes of operation of the present disclosure have been described in the foregoing description.

The invention claimed is:

1. A pitch actuation system for a turbomachine propeller, comprising:
    an actuator having a movable portion configured to be connected to blades of the propeller in order to rotate the blades relative to blade-pitch setting axes, wherein the actuator is an electromechanical actuator, and comprises:
    a blade-pitch control comprising at least one electric motor arranged to drive a rotor about an axis, and a transmission screw arranged to be driven in rotation about the axis by said rotor;
    a nut through which said transmission screw passes and cooperating with the screw so as to move in translation along the axis;
    a member movable both in translation along the axis and in rotation about the axis, the member configured to cooperate with the blades in order to move the blades,
    wherein the nut is connected to the movable member such that a translational movement of the nut causes translational movement of the member but a rotational movement of the member does not cause rotational movement of the nut, and
    wherein the system further comprises decoupling means for operatively associating the nut with the member, wherein said decoupling means comprise at least one ring and two angular contact roller bearings, a first angular contact bearing being mounted between the ring and the nut and a second angular contact bearing being mounted between the ring and the member.

2. The system according to claim 1, wherein the second angular contact bearing comprises an inner ring mounted on a sleeve comprising a blind orifice for receiving an end of the member.

3. The system according to claim 1, wherein a second electric motor is mounted between the ring and the nut and comprises a rotor secured to the ring and a stator secured to the nut.

4. The system according to claim 1, wherein a sensor is mounted between the ring and the nut and comprises a first element secured to the ring and a second element secured to the nut.

5. The system according to claim 4, wherein said sensor is of the inductive or Hall effect type.

6. A method for verifying the condition of the angular contact bearings of the system according to claim 4, comprising the steps of:
    when said blade-pitch control is inactive
    actuating a second electric motor mounted between the nut and the ring in such a way as to set in rotation the ring about the nut, and
    controlling the rotation of the ring by output of the sensor.

7. The system according to claim 1, further comprising means for blocking the nut in rotation.

8. The system according claim 7, wherein the means for blocking in rotation are carried by a casing of the actuator and cooperate with the nut.

9. A turbomachine, comprising:
a propeller with blades of a variable pitch, and
a system according to claim 1, wherein the member cooperates with eccentrics provided on plates for supporting and rotating the blades.

* * * * *